United States Patent [19]

McMurtrey

[11] Patent Number: 5,353,973
[45] Date of Patent: Oct. 11, 1994

[54] WIRE BASKET MOUNTING STRUCTURE

[75] Inventor: David K. McMurtrey, Maysville, Ky.

[73] Assignee: Wald Manufacturing Co., Inc., Maysville, Ky.

[21] Appl. No.: 35,738

[22] Filed: Mar. 23, 1993

[51] Int. Cl.$^5$ ............................................. B62J 7/06
[52] U.S. Cl. ............................................. 224/36; 224/41; 224/30 A
[58] Field of Search .................. 224/36, 30 A, 33 A, 224/39, 41, 42; 280/304.5

[56] References Cited

U.S. PATENT DOCUMENTS

| 1,908,535 | 5/1933 | Pawsat. | |
|---|---|---|---|
| 2,498,446 | 2/1950 | Pawsat | 224/36 |
| 2,805,806 | 9/1957 | Glenny | 224/41 |
| 2,889,096 | 6/1959 | Glenny | 224/36 |
| 3,140,025 | 7/1964 | Persons | 224/36 |
| 3,517,867 | 6/1970 | Fritz. | |
| 3,606,110 | 9/1971 | Pawsat | 224/36 |
| 3,613,970 | 10/1971 | Humlong | 224/36 |
| 3,695,496 | 10/1972 | Humlong | 224/36 |
| 4,269,336 | 5/1981 | Humlong | 224/36 |
| 4,730,758 | 3/1988 | McMurtrey | 224/36 |

FOREIGN PATENT DOCUMENTS 487355 10/1952 Canada ................................ 224/36

OTHER PUBLICATIONS

Wald Catalog No. 92; p. 10; Wald Front Wire Basket Nos. 137, 151, and 157B.
TBG Bicycle Today, Taiwan Bicycle Directory, '92/93 Buyers' Guide, Yi Cheng Ent. Co., Ltd.; p. 751; Yi Cheng Models AO-11, AO-12.

Primary Examiner—Renee S. Luebke
Attorney, Agent, or Firm—Wood, Herron & Evans

[57] ABSTRACT

A basket assembly which provides for quick and easy attachment and detachment of a wire basket from a handle bar of a bicycle while supporting the bottom surface of the bicycle basket. The bottom of the basket is supported by a bracket which interlocks with the webs of the bicycle basket and underlies a bottom surface of the basket. The bracket includes hooks for mounting the basket on the horizontal or branch portions of the handle bar. The support bracket can easily be attached and detached without the requirement of added support structure, hardware, or tools. A top frame of the bicycle basket is secured to the vertical or high rise portions of the handle bar by a pair of hook-shaped clamps.

6 Claims, 2 Drawing Sheets

WIRE BASKET MOUNTING STRUCTURE

BACKGROUND OF THE INVENTION

This invention relates to load carrying baskets for bicycles and the like, and more particularly, to the mounting structure for a load carrying basket secured to the front of "high rise" bicycle handle bars.

There have traditionally been many different ways to secure baskets that mount on the front of bicycles and the like. One type of structure as sold commercially by the assignee of the present invention uses two clamps attached to the top frame of the basket which are secured to the horizontal or branch portions of the handle bar on each side of the handle bar stem of the bicycle. Additionally, two supporting legs are provided which have an upper end attached to the bottom of the basket and an opposite lower end attached to the front wheel axle of the bicycle.

A second type of structure for mounting baskets on the front of a bicycle is represented by U.S. Pat. No. 4,730,758 issued to McMurtrey and assigned to the assignee of the present invention. This mounting structure is characterized by two permanently affixed hooks attached either to the basket itself or to the basket's mounting hardware at a top frame of the basket. The basket is attached to the bicycle by lowering each of these two hooks onto the generally horizontal branch portions of the handle bar extending from each side of the handle bar stem. Once lowered into position, the back side of the basket and an arcuate hardware mounting section rest against the bicycle head tube. The bicycle basket disclosed in U.S. Pat. No. 4,730,758 is not intended to be fixed to the bicycle and can be selectively detached and re-attached to the bicycle as required.

A third group of bicycle baskets which attach to the front of "high rise" handle bars is disclosed in U.S. Pat. Nos. 3,613,970 and 4,269,336 each issued to Humlong and assigned to the assignee of the present invention. The baskets disclosed in each of these patents use four clamps to attach the basket to the front of the handle bar. Two of the clamps attach the top frame of the basket to the vertical portions or risers of the handle bar. The remaining two clamps attach the back side of the basket to the horizontal or branch portions of the handle bar on opposite sides of the handle bar stem.

The first group of baskets described hereinabove are supported by legs attached to the bottom of the basket and the front bicycle wheel axle requires a relatively significant amount of hardware and tools for attachment to the bicycle and cannot be easily detached and re-attached with a minimum amount of effort and time. Similarly, the baskets identified hereinabove in the second group require additional hardware and those in the third group require both additional hardware and effort for attachment to the bicycle. More importantly, these second and third group baskets do not provide support for the bottom of the basket and its contents. In some cases, relatively heavy or fragile items may be carried in the basket which require additional support from the bottom of the basket, which additional support is not available in the second and third group of baskets described previously.

An additional concern not as yet addressed in prior art baskets is the damage of the basket and mounting hardware during shipping and handling prior to attachment to the bicycle. The mounting hardware should preferably not be permanently attached to the basket such that it extends beyond the outer boundaries of the basket. In this way, the hardware is less likely to be damaged during shipping.

SUMMARY OF THE INVENTION

It has been an objective of the invention to provide a bicycle basket which is designed to mount on the front of "high rise" handle bars and is easier to attach than previously designed baskets while providing support to the bottom of the basket and its contents.

It has been a further objective of the invention to provide a bicycle basket with mounting hardware which can easily be shipped and handled prior to installation without damage to the mounting hardware or basket.

These objectives of the invention are obtained by a bicycle basket which is designed for attachment to the front of "high rise" handle bars and includes a support bracket for bracing the bottom of the basket and its contents. The separate support bracket is designed to require no tools for attachment to the basket or the handle bar during assembly. When attachment of the support bracket to the basket is complete, the bracket is interlocked with the bottom of the basket. In order to attach the bracket and basket combination to the bicycle, the bracket has a pair of hooks which are lowered onto the horizontal or branch portions of the handle bar on opposite sides of the handle bar stem.

Two clamps are also provided to attach the top frame of the basket to the vertical or riser portions of the handle bar. The combination of the bottom support bracket and the clamps for the top frame of the basket offer a bicycle basket which can be easily assembled and attached to the bicycle with a minimum amount of hardware and effort while providing support to both the bottom and top portions of the basket.

By designing a support bracket as a separate piece which is not permanently attached to the basket, the bracket and its hooks will not likely be bent or broken during shipping and handling of the basket. The support bracket, in addition to the pair of clamps and bolts for securing the top of the basket, can readily be placed in a bag which is shipped inside the basket. This results in no mounting hardware extending beyond the outer boundaries of the bicycle basket during shipping and handling prior to installation on the bicycle.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
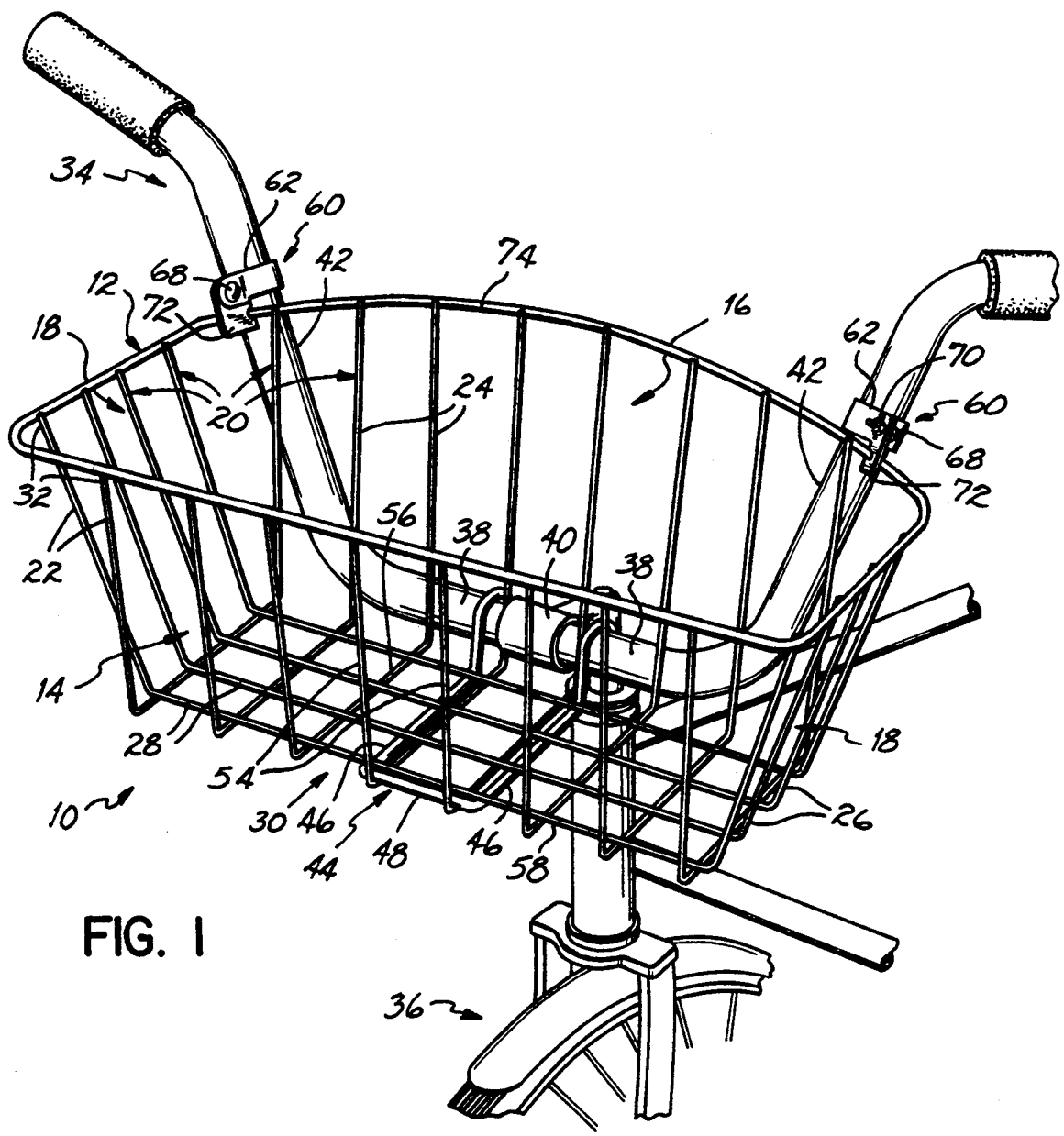
FIG. 1 is a fragmentary perspective view of a front portion of a bicycle showing a basket and a clamping mechanism therefore which embodies the present invention.

As shown in FIG. 1, a typical wire basket 10 comprises a continuous circumferential top frame 12 to which are attached front 14, rear 16, and side edges 18, 18 of the basket 10.

A plurality of U-shaped webs 20 are secured to and carded by the top frame 12 wherein upstanding legs 22 of a first set of webs 24 define the upstanding rear 16 and front 14 walls of the basket 10, and wherein the upstanding legs 22 of a second set of webs 26 define the upstanding side walls 18, 18 of the basket. Bottom or lower legs 28 of the first set 24 and second set 26 of webs collectively define a bottom wall 30 of the basket 10. The bottom legs 28 of the first set of webs 24 are disposed normal or at right angles to the bottom legs 28 of the second set of webs 26.

Upstanding legs 22 of the first set 24 of U-shaped webs 20 and upstanding legs 22 of the second set 26 of U-shaped webs 20 are permanently anchored or welded at a top end 32 to the top frame 12 to provide a sturdy, unitary basket 10.

A handle bar 34 of a bicycle 36 includes horizontal or branch portions 38 on opposite sides of a handle bar stem 40. Attached to each branch portion 38 of the handle bar 34 is a generally vertical or riser portion 42 of the handle bar 34. The horizontal branches 38 and the upstanding risers 42 of the handle bar 34 are typically disposed in a single or common plane.

Interlocked with the bottom 30 of the basket 10 is a support bracket 44 for attachment to the branch portions 38 of the handle bar 34. As can be seen more clearly in FIG. 2, the support bracket 44 is a generally U-shaped member having a pair of parallel bracket legs 46, 46 which are joined together by an interlocking leg 48. The support bracket 44 is designed such that the interlocking leg 48 is offset to lie in a plane parallel to a plane defined by the bracket legs 46, 46 for purposes which will become apparent. Located at a proximal end 50 of each bracket leg 46 is a C-shaped hook 52. The bracket leg 46 and attached C-shaped hook 52 on each side of the support bracket 44 lie in generally parallel, unitary planes.

Figure 2:
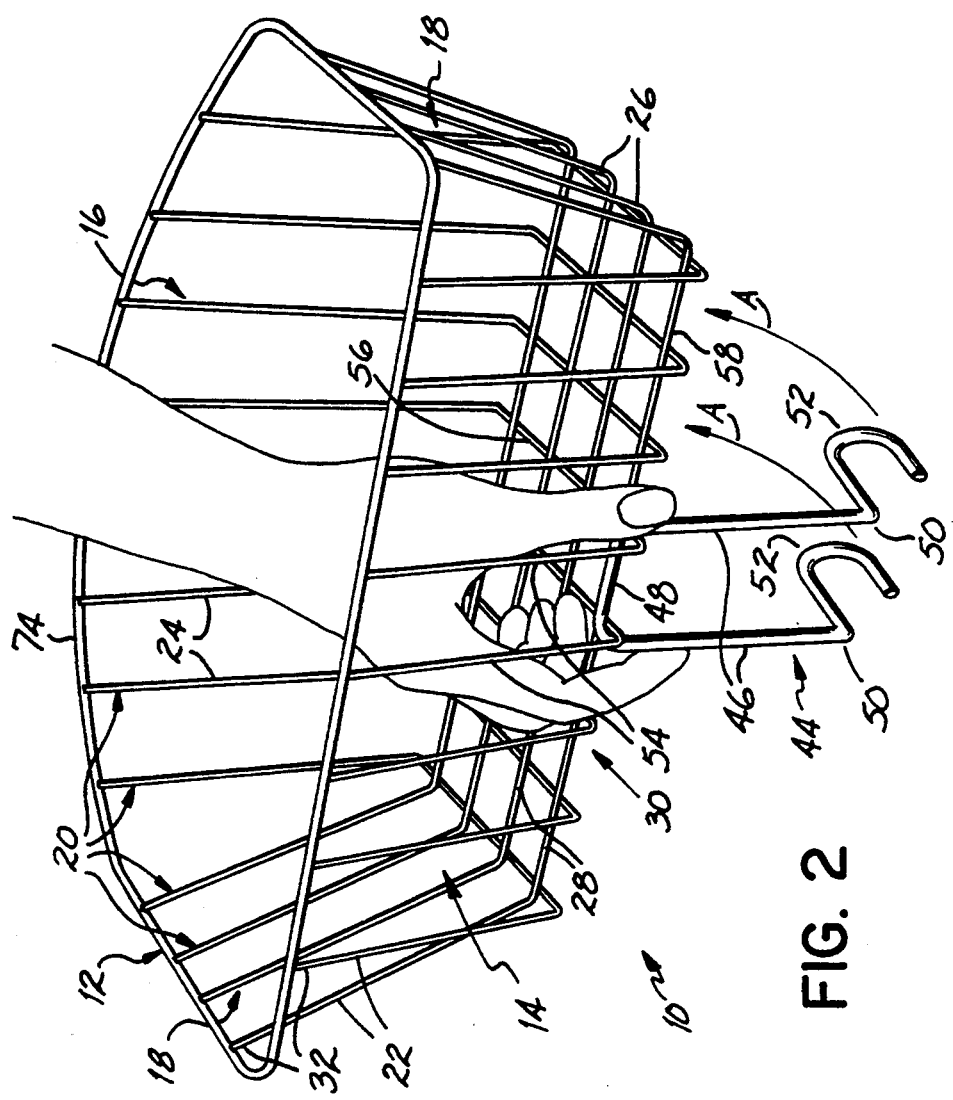
FIG. 2 is a perspective view of the support bracket after being inserted through the bottom of the bicycle basket and prior to being pivoted into position to underlie the bicycle basket.

To assemble the basket and bracket, both bracket legs and attached C-shaped hooks 52 are inserted through the basket bottom 30 such that a pair 54 of the first set 24 of U-shaped webs 20 are interposed between the bracket legs 46, 46 as shown in FIG. 2. The interlocking leg 48 on the support bracket 44 is retained by the bottom leg 28 of the pair 54 of U-shaped webs 20 on an upper surface 56 of the basket bottom 30. Alternatively, the preferred embodiment of the present invention may be assembled by first inserting each bracket leg 46 and attached C-shaped hook 52 through the front wall of the basket 10 and then lowering the support bracket 44 until the interlocking leg 48 comes to rest on the upper surface 56 of the basket bottom 30. Once the interlocking leg 48 is positioned to rest on a pair of webs 54 at the bottom 30 of the basket (after it initially had been inserted through the front wall 14 or the bottom 30 of the basket), the support bracket 44 is then pivoted in the direction indicated by arrows A—A of FIG. 2 until the bracket legs 46, 46 contact and underlie a bottom surface 58 of the basket bottom 30 as shown in FIG. 1. When thus assembled, the support bracket 44 is interlocked with the basket bottom 30 because the interlocking leg 48 of the support bracket 44 rests on the upper surface 56 of the basket bottom 30 and the bracket legs 46, 46 underlie the basket bottom 30. This is made possible by the fact that after assembly with the basket, the interlocking leg 48 lies in a plane above and parallel to the plane in which the bracket legs 46, 46 lie as described hereinabove. The basket 10 can now be attached to the handle bar 34 by hanging the C-shaped hook 52 on each bracket leg 46 over the branch portions 38 of the handle bar 34 as shown in FIG. 1. In this way, the bicycle basket 10 is supported on an underside surface 58 without the benefit of complicated attachment hardware or lengthy assembly procedures.

The basket top frame 12 is secured to the handle bar risers 42, 42 by a hook-like clamp 60 on each riser 42. For all practical purposes, the hook-like clamp 60 is similar, if not identical, to the clamp illustrated in FIG. 2 of U.S. Pat. No. 3,613,970 assigned to the assignee of the present invention. The clamp 60 comprises a metallic ribbon or band 62 having terminal ends 64, 64. The band 62 is curved to securely and releasably embrace the handle bar riser 42. The terminal ends 64 each have an aperture (not shown) to receive a clamping bolt 68. The clamping bolt 68 is secured with a nut 70 to draw the terminal ends 64 together about the risers 42 so as to effect a firm mounting or anchoring of the clamp 60 to the handle bar riser 42.

On one of the terminal ends 64 of the clamp 60 is provided an integral hook 72 which opens inwardly toward the axis of the band. The hook 72 is dimensioned to receive the rear cross member 74 of the top frame 12 of the basket 10.

Figure 3:
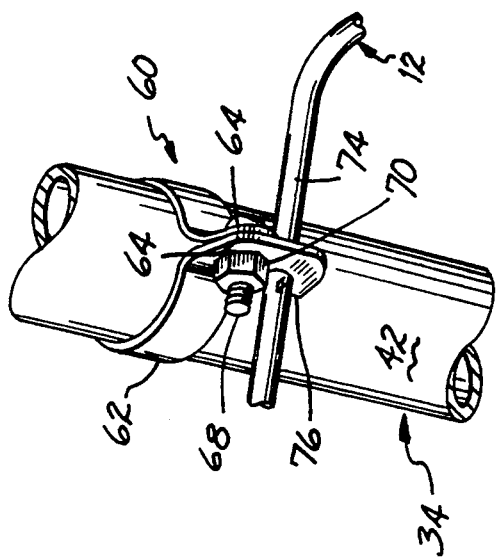
FIG. 3 is an enlarged fragmentary perspective view of a portion of FIG. 1 showing the clamps by which the top frame of the basket is anchored relative to a handle bar riser.

With reference to FIG. 3 it will be noted that the clamp band 62 has been secured in circumscribing relationship to the handle bar riser 42 of FIG. 1. Additionally, the rear leg cross member 74 of the basket top frame 12 is received within the hook 72 in such a manner as to positively preclude disengagement of the top frame 12 from the hook 72. It can be noted that a terminal end 76 of the hook 72 is disposed and closely spaced or near a contacting relationship with the adjacent surface of the handle bar riser 42 when the clamping bolt 68 has been fully tightened as in FIGS. 1 and 3.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims:

I claim:

1. A structure for mounting a wire basket on a bicycle handle bar having a pair of generally opposed horizontal branch portions and upwardly extending risers, said basket including upper front, rear, and side edges defined by a circumferential top frame, and two sets of generally U-shaped webs, each said web having a pair of upstanding legs joined by a lower leg, an upper end of each said upstanding leg being joined to said top frame, said upstanding legs of the first set of said webs defining front and rear walls, said upstanding legs of the second set of said webs defining side walls, said lower leg of each said web of each said first and second sets combining to form a bottom of said basket;

clamp means for detachably anchoring the top frame of the basket to each of the handle bar risers; and support means engaging the basket bottom for detachably bracing the basket bottom on the handle bar branch portions.

2. The wire basket mounting structure of claim 1 wherein said clamp means comprises a pair of clamps secured to and carried by the handle bar risers and including a projecting hook in which the top frame of the basket is received and anchored to and against relative movement with a riser, said hook portion of each said clamp projecting downwardly over, around, and under the top frame of the basket for suspending the basket from the handle bar risers.

3. The wire basket mounting structure of claim 1 wherein said support means comprises a U-shaped bracket having a pair of generally parallel bracket legs joined together by an interlocking leg, said bracket legs capable of being inserted through the basket and positioned such that a pair of webs of said first set of webs is interposed between said bracket legs and said interlocking leg is positioned on top of said lower legs of said pair of webs, said bracket being capable of being pivoted towards said handle bar such that said bracket legs underlie and contact said basket bottom, each said bracket leg terminating in a C-shaped hook adapted to receive said branch portion of said handle bar, each said C-shaped hook projected upwardly around, over, and downwardly around said branch portion of the handle bar.

4. A structure for mounting a wire basket on a bicycle handle bar having a pair of generally opposed horizontal branch portions and upwardly extending risers, said basket including upper front, rear, and side edges defined by a circumferential top frame, and two sets of generally U-shaped webs, each said web having a pair of upstanding leg joined by a lower leg, an upper end of each said upstanding leg being joined to said top frame, said upstanding legs of the first set of said webs defining front and rear walls, said upstanding legs of the second set of said webs defining side walls, said lower leg of each said web of each said first and second sets combining to form a bottom of said basket; and a U-shaped bracket having a pair of generally parallel bracket legs joined together by an interlocking leg, said bracket legs capable of being inserted through the basket and positioned such that a pair of webs of said first set of webs is interposed between said bracket legs and said interlocking leg is positioned on top of said lower legs of said pair of webs, said bracket capable of being pivoted towards said handle bar such that said bracket legs underlie and contact said basket bottom, each said bracket leg terminating in a C-shaped hook adapted to receive said branch portion of said handle bar, each said C-shaped hook projected upwardly around, over, and downwardly around said branch portion of the handle bar.

5. A structure for mounting a basket on a bicycle handle bar having a pair of generally opposed horizontal branch portions and upwardly extending risers, said basket including an inner and outer surface and a bottom and upstanding front, rear and side walls;

a U-shaped bracket having a pair of generally parallel bracket legs joined together by an interlocking leg, said bracket legs being capable of being inserted through a pair of holes in the basket such that said interlocking leg is positioned against an inner surface of the basket, said bracket being capable of being pivoted toward said handle bar after insertion through said pair of holes in the basket such that said bracket legs underlie and contact a lower surface of the basket bottom, each said bracket leg terminating in a C-shaped hook adapted to receive said handle bar branch portion, each said C-shaped hook projecting upwardly around, over, and downwardly around said handle bar branch portion.

6. A structure for mounting a wire basket on a bicycle handle bar having a pair of opposed generally horizontal branch portions and upwardly extending risers, said basket including upper front, rear, and side edges defined by a circumferential top frame, and two sets of generally U-shaped webs, each said web having a pair of upstanding legs joined by a lower leg, an upper end of each said upstanding leg being joined to said top frame, said upstanding legs of a first set of said webs defining said front and said rear edges, said upstanding legs of a second set of said webs defining said side edges, said lower leg of each said web of said first and second sets combining to form a bottom of said basket;

a pair of clamps for detachably securing the top frame of the basket to each of said handle bar risers, each said clamp including a projecting hook in which the top frame of the basket is received and anchored to and against relative movement with a riser, said hook portion of each said clamp projecting downwardly, over, around, and under the top frame of the basket for suspending the basket from said handle bar risers; and a U-shaped bracket for detachably supporting said basket bottom on said handle bar branch portions, said bracket having a pair of generally parallel bracket legs joined together by an interlocking leg, said bracket legs capable of being inserted through the basket and positioned such that a pair of webs of said first set of webs is interposed between said bracket legs and said interlocking leg is positioned on top of said lower legs of said pair of webs, said bracket being capable of being pivoted toward said handle bar such that said bracket legs underlie and contact said basket bottom, each said bracket leg terminating in a C-shaped hook adapted to receive said handle bar branch portion, each said C-shaped hook projecting upwardly around, over, and downwardly around said handle bar branch portion.

* * * * *

UNITED STATES PATENT AND TRADEMARK OFFICE
CERTIFICATE OF CORRECTION

PATENT NO. : 5,353,973
DATED : October 11, 1994
INVENTOR(S) : David K. McMurtrey It is certified that error appears in the above-indentified patent and that said Letters Patent is hereby corrected as shown below:

Column 3, Line 9, "carded" should read --carried--.

Column 3, Line 17, "fight" should read --right--.

Column 4, Line 35, "rear leg cross member 74" should read --rear cross member 74--.

Column 5, Line 33, "upstanding leg" should read --upstanding legs--.

Signed and Sealed this

Thirty-first Day of January, 1995

BRUCE LEHMAN

*Attest:*

*Attesting Officer*          *Commissioner of Patents and Trademarks*